United States Patent
Abraham

[19]

[11] Patent Number: 6,045,064
[45] Date of Patent: Apr. 4, 2000

[54] UNDER-VEHICLE SPRAY DEVICE

[76] Inventor: Michael A. Abraham, 3148 14th St., Port Arthur, Tex. 77642

[21] Appl. No.: 09/105,450

[22] Filed: Jun. 26, 1998

[51] Int. Cl.[7] .............................. B05B 3/18; B05B 15/06
[52] U.S. Cl. ........................................... 239/722; 239/532
[58] Field of Search .................................. 239/722, 754, 239/532, 316–318

[56] References Cited

U.S. PATENT DOCUMENTS

| | | | |
|---|---|---|---|
| 2,638,730 | 5/1953 | Davidson | 239/754 X |
| 3,727,841 | 4/1973 | Hengesbach | 239/532 X |
| 4,580,726 | 4/1986 | Unger | 239/722 |
| 4,982,896 | 1/1991 | Crow | 239/532 X |
| 4,984,746 | 1/1991 | Joyal | 239/722 |
| 5,573,187 | 11/1996 | Proctor | 239/532 |
| 5,671,887 | 9/1997 | Iavarone | 239/532 X |
| 5,725,322 | 3/1998 | Evans | 239/532 X |
| 5,820,037 | 10/1998 | Lawrence | 239/722 |

FOREIGN PATENT DOCUMENTS

| | | | |
|---|---|---|---|
| 902784 | 9/1945 | France | 239/722 |
| 193154 | 12/1964 | Sweden | 239/722 |
| 605214 | 9/1978 | Switzerland | 239/532 |
| 17570 | of 1908 | United Kingdom | 239/532 |
| 1348880 | 3/1974 | United Kingdom | 239/722 |

*Primary Examiner*—Lesley D. Morris

[57] ABSTRACT

A garden hose attachment for cleaning an underside of a vehicle is provided including at least one elongated rigid tube having a pair of ends. At least one elbow conduit is coupled to one of the ends of the rigid tube. A spray nozzle is connected to the elbow conduit. Also included is a spray gun mounted to one of the ends of the rigid tube. Upon the depression of a trigger of the spray gun, water is sprayed from the spray nozzle.

5 Claims, 1 Drawing Sheet

UNDER-VEHICLE SPRAY DEVICE

BACKGROUND OF THE INVENTION

1. Field of the Invention

The present invention relates to under-car washes and more particularly pertains to a new under-vehicle spray device for conveniently cleaning an underside of a vehicle.

2. Description of the Prior Art

The use of under-car washes is known in the prior art. More specifically, under-car washes heretofore devised and utilized are known to consist basically of familiar, expected and obvious structural configurations, notwithstanding the myriad of designs encompassed by the crowded prior art which have been developed for the fulfillment of countless objectives and requirements.

Known prior art under-car washes include U.S. Pat. No. 4,580,726; U.S. Pat. No. 5,022,586; U.S. Pat. No. 3,931,931; U.S. Pat. No. 3,041,655; U.S. Pat. No. 2,896,239; and EP 0 100 680 A2; and WO 94/19221.

In these respects, the under-vehicle spray device according to the present invention substantially departs from the conventional concepts and designs of the prior art, and in so doing provides an apparatus primarily developed for the purpose of conveniently cleaning an underside of a vehicle.

SUMMARY OF THE INVENTION

In view of the foregoing disadvantages inherent in the known types of under-car washes now present in the prior art, the present invention provides a new under-vehicle spray device construction wherein the same can be utilized for conveniently cleaning an underside of a vehicle.

The general purpose of the present invention, which will be described subsequently in greater detail, is to provide a new under-vehicle spray device apparatus and method which has many of the advantages of the under-car washes mentioned heretofore and many novel features that result in a new under-vehicle spray device which is not anticipated, rendered obvious, suggested, or even implied by any of the prior art under-car washes, either alone or in any combination thereof.

To attain this, the present invention generally comprises a pair of elongated rigid tubes each having a similar length and a pair of ends. At least one of such ends is threaded. A first couple includes a short sleeve having a threaded interior for screwably coupling with the threaded ends of the tubes. As such, the tubes remain in linear alignment and in communication. Associated therewith is a second couple including a long sleeve having a pair of end portions each with a threaded interior for screwably coupling with the threaded ends of the tubes. Accordingly, the tubes remain in linear alignment and in communication when coupled. The second couple is further equipped with an intermediate compartment with a cleaning substance situated therein for mixing with water passing through the tubes. Next provided is a pair of elbow conduits each having a pair of short extents perpendicularly coupled with respect to each other. An end of one of the short extents has a threaded interior and an end of another one of the short extents is integrally coupled with the corresponding end of the associated interconnected tube. As such, at least one of the short extents of each elbow extends radially from the interconnected tubes in a similar direction. Also included is a cone-shaped spray nozzle threadedly connected to the threaded end of the corresponding elbow conduit. As best shown in FIG. 2, a spray gun has a barrel portion threadedly connected to the threaded end of the corresponding elbow. The spray gun further has a handle portion perpendicular with respect to the barrel portion and having a trigger mounted on a rear face thereof. An end inlet of the handle portion is adapted for coupling with a garden hose. Upon the depression of the trigger, water is thus sprayed from the spray nozzle. Finally, a single swivel wheel is mounted to an end of one of the tubes adjacent to the elbow having the spray nozzle coupled thereto. During use, the swivel wheel is adapted for facilitating the maneuvering of the spray nozzle underneath a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new under-vehicle spray device apparatus and method which has many of the advantages of the under-car washes mentioned heretofore and many novel features that result in a new under-vehicle spray device which is not anticipated, rendered obvious, suggested, or even implied by any of the prior art under-car washes, either alone or in any combination thereof.

It is another object of the present invention to provide a new under-vehicle spray device which may be easily and efficiently manufactured and marketed.

It is a further object of the present invention to provide a new under-vehicle spray device which is of a durable and reliable construction.

An even further object of the present invention is to provide a new under-vehicle spray device which is susceptible of a low cost of manufacture with regard to both materials and labor, and which accordingly is then susceptible of low prices of sale to the consuming public, thereby making such under-vehicle spray device economically available to the buying public.

Still yet another object of the present invention is to provide a new under-vehicle spray device which provides in the apparatuses and methods of the prior art some of the advantages thereof, while simultaneously overcoming some of the disadvantages normally associated therewith.

Still another object of the present invention is to provide a new under-vehicle spray device for conveniently cleaning an underside of a vehicle.

Even still another object of the present invention is to provide a new under-vehicle spray device that includes at least one elongated rigid tube having a pair of ends. At least one elbow conduit is coupled to one of the ends of the rigid tube. A spray nozzle is connected to the elbow conduit. Also included is a spray gun mounted to one of the ends of the rigid tube. Upon the depression of a trigger of the spray gun, water is sprayed from the spray nozzle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
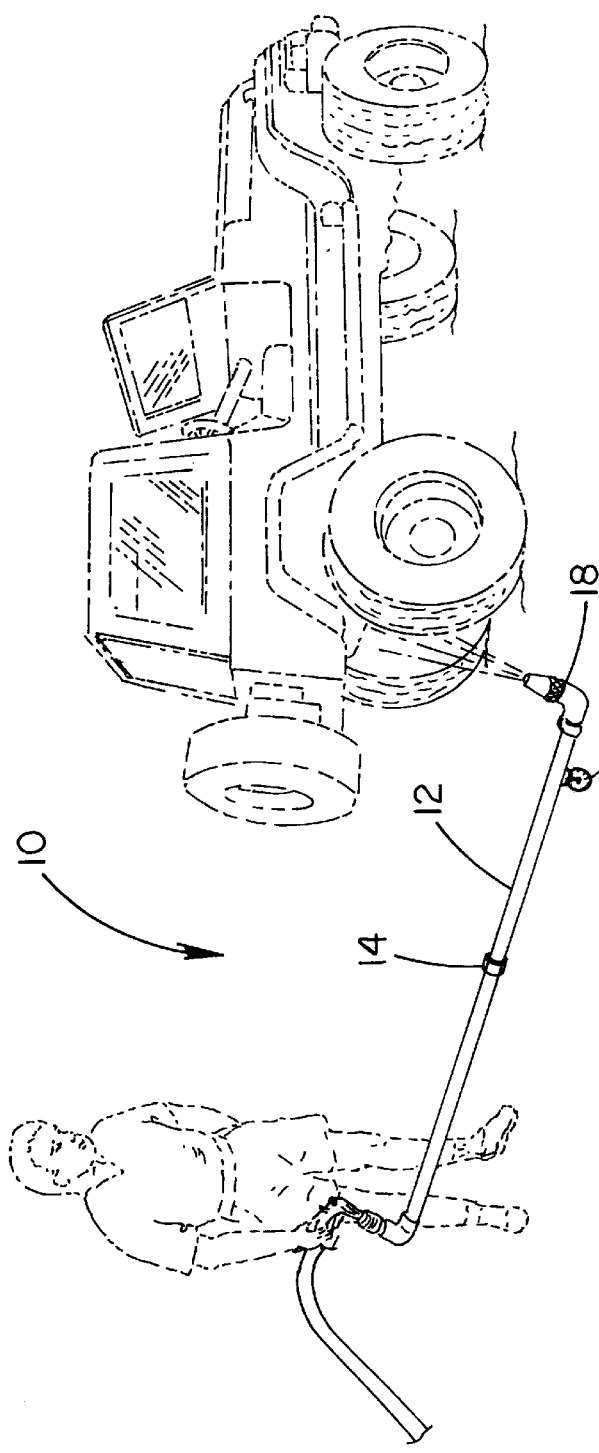
FIG. 1 is a perspective view of a new under-vehicle spray device according to the present invention.
Figure 2:
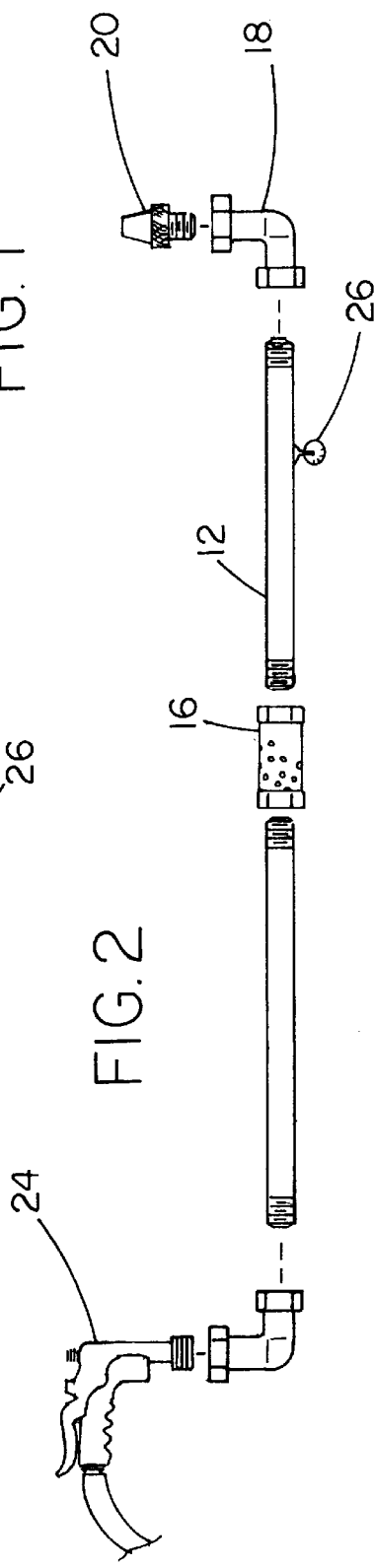
FIG. 2 is a side view of the present invention with a soap-dispensing couple employed.

With reference now to the drawings, and in particular to FIGS. 1 through 2 thereof, a new under-vehicle spray device embodying the principles and concepts of the present invention and generally designated by the reference numeral 10 will be described.

The present invention, designated as numeral 10, includes a pair of elongated rigid tubes 12 each having a similar length and a pair of ends. At least one of the ends has a threaded outer surface. A first couple 14 includes a short sleeve having a threaded interior for screwably coupling with the threaded ends of the tubes. As such, the tubes remain in linear alignment and in communication. Note FIG. 1.

Associated therewith is a second couple 16 including a long sleeve having a pair of end portions each with a threaded interior for screwably coupling with the threaded ends of the tubes. See FIG. 2. Accordingly, the tubes remain in linear alignment and in communication when coupled. The second couple is further equipped with an intermediate compartment with a cleaning substance situated therein for mixing with water passing through the tubes. To facilitate such operation, a pair of sponges or screens are mounted at ends of the second couple to somewhat contain the cleaning substance, or soap.

Next provided is a pair of elbow conduits 18 each having a pair of short extents perpendicularly coupled with respect to each other. It should be noted that each of the short extents has a length that is less than 1/10 that of each rigid tube. One end of each short extent is integrally coupled with the corresponding end of the associated interconnected tube. During use, at least one of the short extents of each elbow extends radially from the interconnected tubes in a similar direction.

Also included is a cone-shapeo spray nozzle 20 threadedly connected to the threaded end of the corresponding elbow conduit. The spray nozzle is preferably adjustable for providing varying spray configurations.

As best shown in FIG. 2, a spray gun 24 has a barrel portion threadedly connected to the threaded end of the corresponding elbow. The spray gun further has a handle portion perpendicular with respect to the barrel portion and having a trigger mounted on a rear face thereof. An end inlet of the handle portion is adapted for coupling with a garden hose. Upon the depression of the trigger, water is thus sprayed from the spray nozzle. As shown in FIG. 2, the handle portion remains along an axis parallel to that of the rigid tubes during use.

Finally, a single swivel wheel 26 is mounted to an end of one of the tubes adjacent to the elbow having the spray nozzle coupled thereto. Such coupling preferably takes place on a side of the corresponding rigid tube opposite that from which the elbow extends. During use, the swivel wheel is adapted for facilitating the maneuvering of the spray nozzle underneath a vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A hose attachment for cleaning an underside of a vehicle comprising:

a pair of elongated rigid tubes each having a similar length and a pair of ends one of which having a threaded outer surface;

a first couple including a short sleeve having a threaded interior for screwably coupling with the ends of the tubes such that the tubes remain in linear alignment and in communication;

a pair of elbow conduits each having a pair of short extents perpendicularly coupled with respect to each other and further with ends, one of this ends being threaded and another one of the ends being integrally coupled with the corresponding end of the associated interconnected tubes such that at least one of the short extents of each elbow extends radially from the interconnected tubes in a similar direction, each of the elbow conduits being a substantially 90 degree elbow;

a spray nozzle threadedly connected to one of the ends of one of the elbow conduits;

a spray gun having a barrel portion threadedly connected to one of the ends of the other of the elbow conduits, the spray gun having a handle portion being oriented substantially perpendicular with respect to the barrel portion and being oriented substantially parallel to the tubes for permitting a hand of a user gripping the handle portion to be maintained in a comfortable position with the arm of the user extending substantially straight downward from the shoulder of the user, the spray gun having a trigger mounted adjacent to the handle portion for permitting tight hand gripping of the handle portion to actuate the trigger without removing the hand from the handle portion, the spray gun having an end inlet for coupling with a hose, the end inlet being in line with the handle portion such that a hose connected to the end inlet may extend substantially parallel to the tubes without kinking the hose; and a swivel wheel mounted to one of the tribes adjacent to the elbow conduit having the spray nozzle coupled thereto for facilitating the maneuvering of the spray nozzle underneath a vehicle.

2. An attachment for cleaning an underside of a vehicle comprising:

at least one elongated rigid tube having a pair of ends;

elbow conduits located at each end of the rigid tube, each of the elbow conduits comprising a substantially 90 degree elbow;

a spray nozzle connected to one of the elbow conduit;

a spray gun having a barrel portion threadedly connected to the one of the elbow conduits, the spray gun having a handle portion being oriented substantially perpendicular with respect to the barrel portion and being oriented substantially parallel to the tube for permitting a hand of a user gripping the handle portion to be maintained in a comfortable position with the arm of the user extending substantially straight downward from the shoulder of the user, the spray gun having a trigger mounted adjacent to the handle portion for permitting tight hand gripping of the handle portion and trigger to actuate the trigger without removing the hand from the handle portion the spray gun having an end inlet for coupling with a hose, the end inlet being in line with the handle portion such that a hose connected to the end inlet may extend substantially parallel to the tube without kinking the hose; and a swivel wheel mounted to one of the tubes adjacent to the elbow conduit having the spray nozzle coupled thereto for facilitating the maneuvering of the spray nozzle underneath a vehicle.

3. An attachment for cleaning an underside of a vehicle as set forth in claim 2 wherein the elbow conduits are separable from the rigid tube.

4. An attachment for cleaning an underside of a vehicle as set forth in claim 2 wherein the rigid tube includes a pair of separable tube portions of substantially equal length for permitting adjustment of an effective length of the rigid tube.

5. An attachment for cleaning an underside of a vehicle as set forth in claim 2 wherein the trigger is positioned on a said of the handle portion opposite the direction of the barrel portion for permitting the handle portion to rest on the fingers of the user without actuating the trigger.

\* \* \* \* \*